July 28, 1931. L. E. WHITON 1,816,105
CHUCK
Filed Sept. 21, 1927 2 Sheets-Sheet 1

INVENTOR.
Lucius E. Whiton
BY
ATTORNEY

July 28, 1931.　　　L. E. WHITON　　　1,816,105
CHUCK
Filed Sept. 21, 1927　　　2 Sheets-Sheet 2
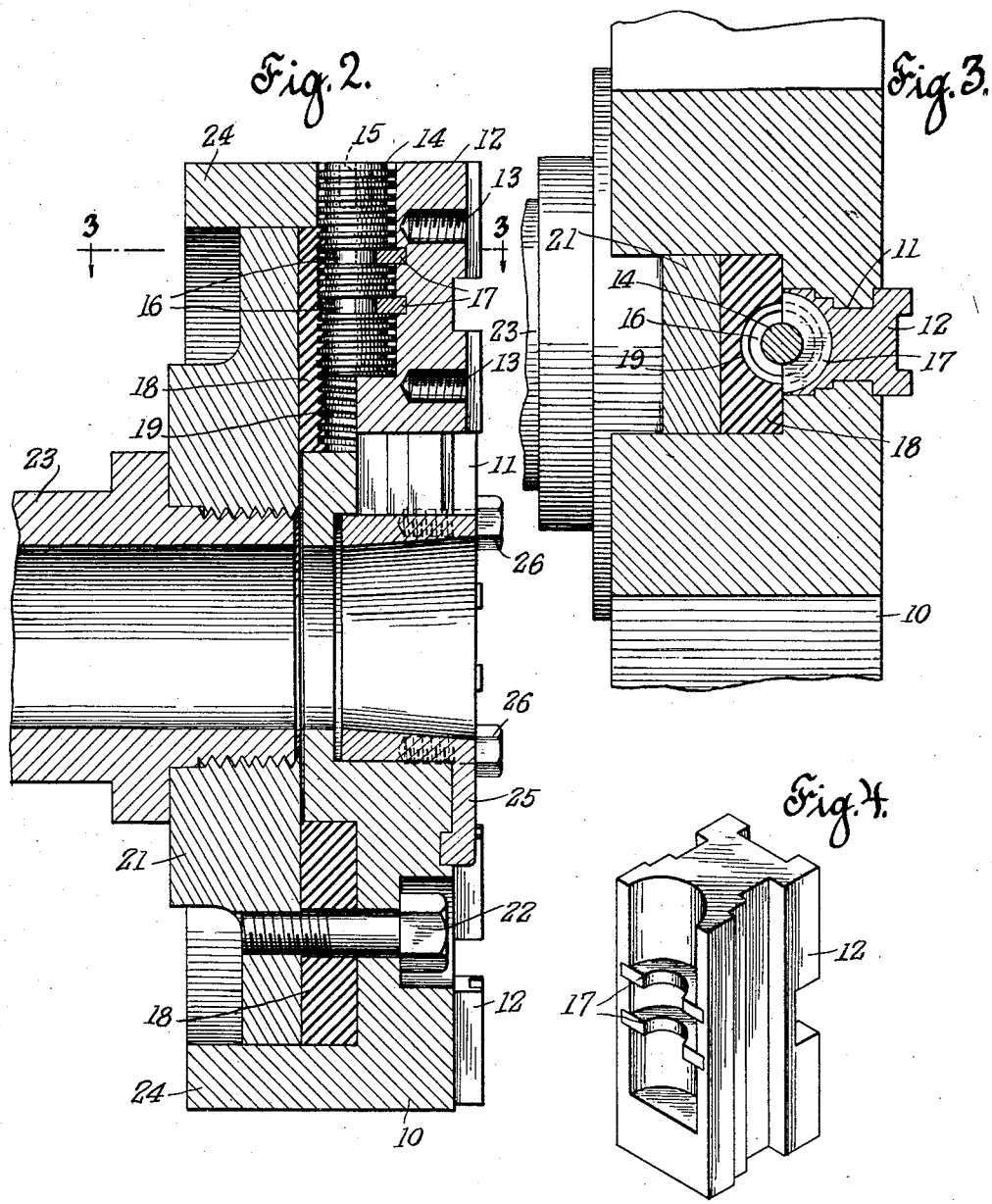
INVENTOR.
Lucius E. Whiton
BY Patented July 28, 1931

1,816,105

UNITED STATES PATENT OFFICE

LUCIUS E. WHITON, OF NEW LONDON, CONNECTICUT

CHUCK

Application filed September 21, 1927. Serial No. 220,981.

This invention relates to chucks and has for its object to standardize and cheapen the construction and at the same time increase the life of a chuck through the provision of means to take up wear and readily renew worn parts.

Heretofore the various types of chucks such as independent, scroll, power, wrenchless, etc. have been regarded as of such distinctive construction that all parts have been made especially for the type intended but under this invention the chuck body has been standardized in shape so as to be adapted for service in any of the various types of chucks with a small amount of machining, the total amount of finishing being reduced.

Another defect in previous chuck construction has been the wear in the jaw actuating mechanism and its cooperative parts resulting from stresses it is required to withstand when the jaws tightly clamp the work. This wear causes lost motion which is objectionable in many types of chucks and with various kinds of work where accuracy is needed in clamping and centering. With this invention not only are the parts which are subjected to wear easily removable for renewal but the wear occurs first in an element containing spare portions that are adapted to be brought into cooperation with the jaw actuating mechanism to displace other and worn portions.

According to this invention a chuck is provided with the usual guide grooves in which the jaws are adjustable and the jaw actuating mechanism cooperates with a member of relatively soft metal in which the wear occurs. This member contains a plurality of sets of portions for selective engagement with the jaw actuating mechanism according to the setting or adjustment of this member in the chuck. Another feature of this invention resides in making the body portion of the chuck cup-shaped and the sides axially long enough so that the same body portion is adapted for use with any type of chuck.

Referring to the drawings, Fig. 1 shows a chuck partly in section embodying this invention.

Fig. 2 is a section on the line 2—2 of Fig. 1.

Fig. 3 is a section on the line 3—3 of Fig. 2.

Fig. 4 is a perspective of one of the adjustable jaw members.

Figure 1:
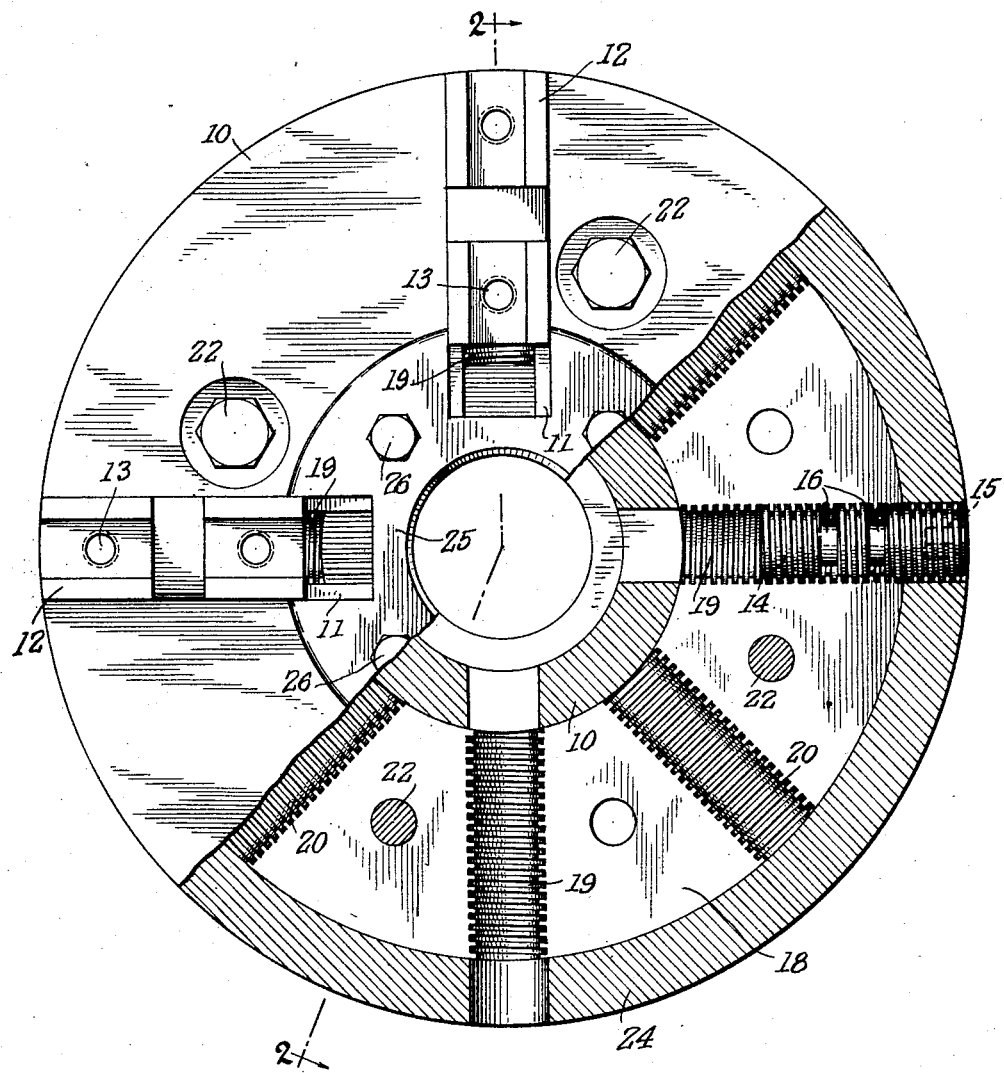

As shown in Fig. 2, the body portion 10 of the chuck comprises a cup-shaped forging provided with raidial guide grooves 11 in which are mounted the work-holding jaws 12. In the embodiment illustrated the members 12 are jaw bases, the work-holding jaws being fastened thereto by bolts engaging the threaded holes 13 but inasmuch as the bases are a part of the work-holding jaws they are hereinafter referred to merely as the jaws.

In the type of chuck illustrated, the jaw actuating mechanism includes screws 14 preferably, as usual, formed of steel and provided in their outer ends with sockets 15 to receive the adjusting wrench. The screws are not in threaded engagement with the jaws but both move radially during adjustment, the jaws being provided with removable flanges 17 preferably of hardened steel which engage in grooves 16 in screws 14. A plate 18 of bronze or other suitable metal is provided with a plurality of sets of threaded portions 19 and 20 angularly spaced the threaded portions 19 being engaged by the screws while portions 20 are not used. A cast iron supporting plate 21 is threaded on to a spindle 23 of a lathe or other machine tool carrying the chuck while bolts 22 clamp the body portion 10, plate 18, and supporting plate 21 together. As shown in Fig. 2, a pilot bushing 25 is held in position by the bolts 26. This bushing reenforces the face plate and serves to support and center boring tools, tool holders, tool rests, etc.

One advantage of this invention resides in the body portion 10 being cup-shaped and the walls 24 extending axially far enough to permit any type of jaw actuating mechanism such as a scroll plate to be mounted within the body portion. In the type of chuck illustrated, it is only necessary to drill holes in the body portion to receive the wrench for actuating the screws 14, but it will be understood that when some other type of chuck is to be constructed the body portion 10 need receive only a small amount of finishing, whether the jaw actuating mechanism be of scroll, power, wrenchless or any other well known type.

Another feature of this invention resides in the provision of means cooperating with the jaw actuating mechanism to take up wear and prolong the life of the chuck especially where precision is necessary. As shown in Fig. 4, the flanges 17 are seated in grooves in the jaws 12 and to remove such flanges it is only necessary to rotate these flanges in their grooves as for example by means of a hammer and punch. The plate 18 having two sets of threaded portions one of which has engagement with the jaw actuating mechanism at a time, enables any lost motion or looseness in the screw threads to be compensated for by adjusting the plate 18 so that the other or spare set of threaded portions is brought into engagement with the screws 14 instead of the first set. To do this it is only necessary to loosen and remove the bolts 22 and rotate the plate 18 forty-five degrees with respect to the body portion 10 when on reinserting the bolts 22 the spare set of threaded portions 20 engage the screws 14 instead of the previously worn set 18. When both sets of threaded portions have been worn the plate 18 is then removable without difficulty.

I claim:

1. A chuck comprising in combination a cup-shaped body portion provided with guide grooves, work-holding jaws adjustable along said grooves, actuating screws for the jaws, a removable ring member having threaded engagement with all of said screws within said body portion, and means also within said body portion and secured thereto for supporting the same on a spindle.

2. A chuck comprising in combination a body portion having therein guide grooves, work-holding jaws adjustable in said grooves, actuating mechanism for said jaws, a plate within said body portion having a plurality of means for selective cooperation with said jaw actuating mechanism, and positive interlocking and clamping means for adjusting the position of said plate means in said chuck.

3. A chuck comprising in combination a body portion having radial guide grooves, work-holding jaws adjustable in said grooves, jaw actuating mechanism, and means on said jaws cooperating with said mechanism, said means comprising a removable hardened projecting flange arranged to transmit work-holding stress between said jaws and mechanism.

4. A chuck comprising in combination a body portion having therein radial guide grooves, work-holding jaws adjustable in said grooves, steel screws for actuating said jaws, said screws being radially movable with said jaws, and a bronze ring member secured to said body portion and in threaded engagement with said screws.

5. A chuck comprising in combination a body portion having therein radial guide grooves, work-holding jaws adjustable in said grooves, screws for actuating said jaws, said screws being radially movable with said jaws, and a bronze member secured to said body portion and in threaded engagement with all of said screws, a supporting ring and means passing through said body portion, bronze member, and supporting ring for clamping said bronze member between the body portion and ring.

6. A chuck comprising in combination a body portion having guide grooves, work-holding jaws adjustable therein, actuating mechanism for the jaws including radial screws, a member in said chuck for cooperation with said actuating mechanism including a single ring engaging all of said screws, said mechanism and member being of dissimilar metals one being of steel and the other of softer metal.

7. A chuck comprising in combination a body portion having radial guide grooves, work-holding jaws adjustable in said grooves, jaw actuating screws and removable actuating plates on said jaws cooperating with grooves in said screws.

8. An enclosed separable abutment ring for chucks having a plurality of screw threaded seats arranged radially in one face.

9. A chuck comprising a cup-shaped body portion, jaws, actuating mechanism for the jaws including screws and a threaded plate, a supporting ring enclosing and clamping said plate to the body portion, securing means passing through the body portion, plate, and supporting ring, and means for securing said supporting ring to a spindle.

LUCIUS E. WHITON.